D. D. KING.
DIRECTION INDICATOR FOR VEHICLES.
APPLICATION FILED MAY 31, 1913.
1,179,197.
Patented Apr. 11, 1916.
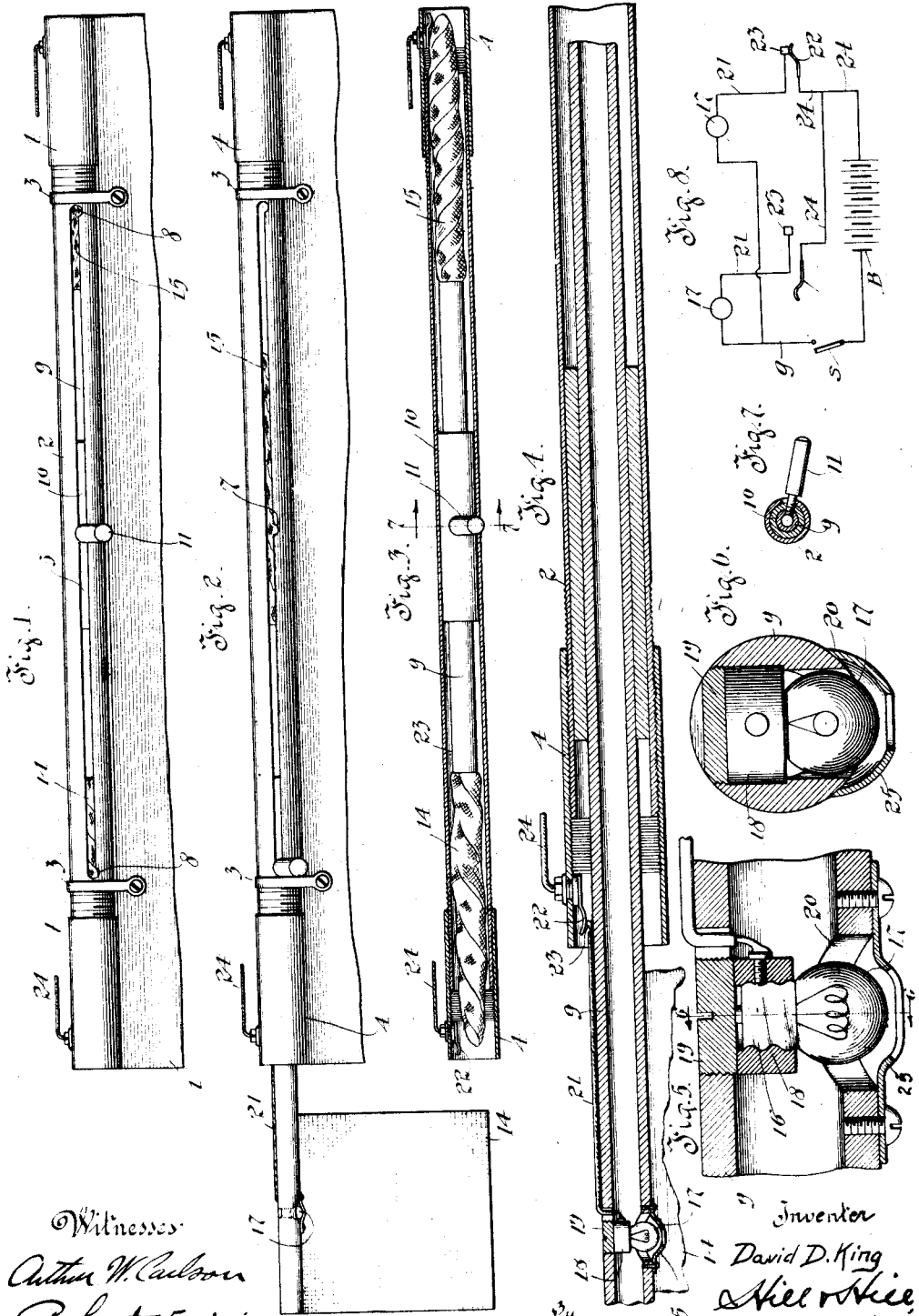

UNITED STATES PATENT OFFICE.

DAVID D. KING, OF CHICAGO, ILLINOIS.

DIRECTION-INDICATOR FOR VEHICLES.

1,179,197.  Specification of Letters Patent.  Patented Apr. 11, 1916.

Application filed May 31, 1913. Serial No. 771,009.

*To all whom it may concern:*

Be it known that I, DAVID D. KING, a citizen of the United States, residing at Chicago, in the county of Cook and State of Illinois, have invented certain new and useful Improvements in Direction-Indicators for Vehicles, of which the following is a description.

My invention belongs to that general class of devices known as indicators, and relates particularly to an indicator for use on vehicles for indicating the intended change in direction of travel of the vehicle. It is customary, particularly with motor vehicles, for the operator, or someone in the vehicle, to extend a hand from one side of the vehicle to indicate that the same is going to turn to that side or in the indicated direction. This is in many cases not only very inconvenient, but also often a cause and excuse for accidents, since, if the driver gives the signal, one of his hands is taken away from the controlling mechanism when it might be required in an emergency. Usually the signal is intended to warn those at the rear or following, but with the present invention it also affords a signal to an approaching vehicle as well. It may be set or displayed whenever desired so that the other vehicles may have timely notice of the intended change in the direction of travel.

The invention has among its objects the production of a device of the kind described that is extremely simple, convenient, durable, attractive, efficient, and satisfactory, that may be manufactured at comparatively small cost, and is applicable for all types and kinds of vehicles, whether it be automobile, motorcycle or bicycle, or horse drawn vehicles.

To this end my invention consists in the novel construction, arrangement and combination of parts herein shown and described, and more particularly pointed out in the claims.

In the drawings, wherein like reference characters indicate like or corresponding parts, Figure 1 is a view in elevation of the device, the signaling mechanism being out of operative or display position. Fig. 2 is a similar view, showing a signal displayed at the left. Fig. 3 is a sectional view of the device, the parts in the same position shown in Fig. 1. Fig. 4 is an enlarged sectional view of a portion of the device, the parts in the position shown in Fig. 2. Fig. 5 is an enlarged view of the lamp shown in the other figures. Fig. 6 is substantially a sectional view on line 6, 6 of Fig. 5. Fig. 7 is substantially a sectional view taken on line 7, 7 of Fig. 3, and Fig. 8 is a diagrammatic view, illustrating a simple method of wiring.

In the drawings, I have shown the device equipped with small flags for use in the day time and night, and a small electric light for illuminating the flags at night.

Referring to the drawings, 1 represents a portion of the vehicle upon which the device is carried, as, for example, the dashboard of an automobile. Secured to the vehicle by clamps or brackets 3, or any equivalent for the purpose, is a tube 2, which is shown provided with adjustable ends 4, so that it may be fitted to the width of the dash of the vehicle. The tube is provided with a slot 5, preferably having a notch 7 intermediate the ends of the slot 5, and notches 8 proximate the ends, the purpose of the same being explained hereafter. Arranged in the tube is a rod or bar 9 of suitable length. The rod 9 in the preferred construction is made of slightly less diameter than the interior of the pipe or tube 2, and is supported at the middle by a filler 10, from which extends an operating button or lever 11, the same being of sufficient length to extend to the exterior of the tube 2. Upon one end of the rod 9 is arranged a flag 14, a flag 15 being also secured to the opposite end. These flags may be made of any suitable material, preferably of light silk, or the equivalent, that may be folded in a comparatively small space. The proportions of the several bars are so arranged that when the operating or controlling part 11 is at the center notch 7 in the slot 5, both flags will be folded within the outer tube 2. When, however, the rod 9 is pushed to either end, the flag at that end will unfurl and be displayed, as indicated in Fig. 2. The flag being of comparatively light material, draws into the tube when the rod is pushed back to the position shown in Figs. 1 and 3.

While the device, when constructed as described, is sufficient for use in the day time, and in many cases at night, where the streets are well lighted, if desired, additional means may be employed for lighting the flag, or showing a light. In the drawing, I have shown a small lamp at each flag, which, while it may be seen from the rear or front, primarily is intended to illuminate the flag. The lighting apparatus shown is made of the desired size, but preferably so that it does not in any way interfere with the operation of the apparatus in folding or unfolding the flags. It is also preferably made so that when the signal is out of operation, the lamps are off, but when the flag is displayed, the lamp is automatically lighted by displaying the flag. Suitable means is, of course, provided for cutting out the lamps in the day time. As most clearly shown in Figs. 4, 5 and 6, where a lamp is employed in connection with the device, the rod or bar 9 is made tubular. This, however, is not entirely necessary, but it makes the construction somewhat lighter in weight. As shown, lamps 17 are provided, one at each end of the rod, the same being mounted on the rod in any convenient way. Referring to the figures mentioned, the lamp 17 is mounted in an insulated block 18, secured to a cap 19, threaded for engagement with the rod 9. The rod is provided with a hole 20 opposite the lamp, so that the light may be seen. A cap 25 protects the lamp from injury. One contact of the lamp is connected on the cap 19 and through the rod 9 and casing 2, to a battery or suitable source of energy. The other contact may be connected by a conductor 21 to a contact 23, adapted to coöperate with the contact 22 when the signal is in operative or display position. The contact 22, which is insulated from the casing 2, is connected by a conductor 24, or the equivalent, to the source of energy. If desired, conductor 21 may extend on the interior of the rod 9.

In Fig. 8 is illustrated a simple method of wiring the apparatus when constructed as shown. Referring to this figure, B represents a battery or other source of energy, which is connected by the conductors 24 to the contacts 22. The opposite side of the battery may be grounded to the tube 2, and through the several parts thereby connecting to the lamps. A switch S is preferably provided for breaking the circuit when it is not desired to use the lamps in signaling, as, for example, during the day time. At night the switch S may be closed. When the signal is displayed, as shown in Figs. 2 and 4, the contact 23 at the extreme outward position of the signal contacts with the contact 22, so that the circuit is closed, lighting the lamp at the associated displayed signal. If the opposite flag 15 is displayed, its associated lamp is lighted. The operation of the device is obvious. When it is desired to turn to the left, the button or lever 11 is pushed to the left, displaying flag 14 at the left, the slot end limiting the movement of the parts. If it is desired to turn to the right, shifting the parts to the opposite side, displays signal 15. While I have shown the lamps 17 for illuminating the flags, I do not wish to be understood as indicating that the same is necessary, as the tube 2 may be so disposed that the vehicle lamps will accomplish the same purpose, or any equivalent means employed. It might be mentioned that the rod 9 may, of course, be made in two parts, a part for each signal. In this case, a handle 11 would be provided for each of the parts. This construction is so obvious that it is not considered necessary to illustrate the same.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. A vehicle signaling device comprising an outer tubular member adapted to be supported upon a dash board or the like of a vehicle, said tubular member being threaded at its outer ends, enlarged tubular extensions at the ends of the tubular member, having a threaded engagement therewith to the end that the outer tubular member may be lengthwise adjusted, an inner tubular rod of less diameter than the outer tubular member, a filler member interposed between the tubular rod and the outer tubular member, said rod being slidable longitudinally relative to the outer tubular member and having at its respective ends signaling devices adapted in one position of said rod to be folded within the space between the rod and the enlarged extensions of the outer tubular member, and a common actuating device for the rod whereby to impart sliding movement thereto to expose either of said signaling devices beyond the extensions of the outer tubular member at will.

2. A direction indicator for vehicles comprising a tubular member open at its respective ends and adapted to be supported upon a vehicle or the like, said tubular member having a longitudinally extended slot terminating at points adjacent the ends of the tube and said slot being enlarged at its ends, a slidable cylindrical member of less diameter and length than that of the tubular member and mounted in the latter, flexible flags mounted upon the ends of said cylindrical member, a filler member interposed between the cylindrical member and tubular member and connected to the cylindrical member at a point substantially midway of the ends of the latter, and an operating member connected to the filler member and projecting through the slot of the tubular member whereby the cylindrical member may be moved longitudinally to expose one or the other of the flexible flags carried thereby, and said operating member adapted to seat in the enlarged portions of the slot whereby to retain the flags in adjusted positions.

3. A direction indicator for vehicles comprising a tubular member open at its respective ends and adapted to be supported upon a vehicle or the like, said tubular member having a longitudinally extended slot terminating at points adjacent the ends of the tube and said slot being enlarged at its ends and having an enlarged part midway of its ends, a slidable cylindrical member of less diameter and length than that of the tubular member mounted in the latter, flexible flags mounted upon the ends of said cylindrical member, a filler member interposed between the cylindrical member and tubular member and connected to the cylindrical member at a point substantially midway of the ends of the latter, and an operating member connected to the filler member and projecting through the slot of the tubular member whereby the cylindrical member may be moved longitudinally to expose one or the other of the flexible flags carried thereby, and said operating member adapted to seat in the enlarged portions of the slot whereby to retain the flags in adjusted positions.

In testimony whereof, I have hereunto signed my name in the presence of two subscribing witnesses.

DAVID D. KING.

Witnesses:
 Roy W. Hill,
 Charles I. Cobb.